(12) United States Patent
Mihara

(10) Patent No.: US 12,258,114 B2
(45) Date of Patent: Mar. 25, 2025

(54) OUTBOARD ENGINE

(71) Applicant: HONDA MOTOR CO., LTD., Tokyo (JP)

(72) Inventor: Takahiro Mihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 482 days.

(21) Appl. No.: 17/692,225

(22) Filed: Mar. 11, 2022

(65) Prior Publication Data

US 2022/0297814 A1 Sep. 22, 2022

(30) Foreign Application Priority Data

Mar. 19, 2021 (JP) .................. 2021-045333

(51) Int. Cl.
| | |
|---|---|
| B63H 21/38 | (2006.01) |
| B63H 20/12 | (2006.01) |
| B63H 21/21 | (2006.01) |
| B63H 23/06 | (2006.01) |
| B63H 23/34 | (2006.01) |
| F16H 57/04 | (2010.01) |

(52) U.S. Cl.
CPC .......... *B63H 21/386* (2013.01); *B63H 20/12* (2013.01); *B63H 21/21* (2013.01); *B63H 23/06* (2013.01); *B63H 23/34* (2013.01); *F16H 57/0415* (2013.01); *F16H 57/0424* (2013.01); *F16H 57/043* (2013.01); *F16H 57/0436* (2013.01); *F16H 57/0452* (2013.01); *F16H 57/0476* (2013.01); *F16H 57/0495* (2013.01)

(58) Field of Classification Search
CPC ...... B63H 21/00; B63H 21/21; B63H 21/386; B63H 20/00; B63H 20/12; B63H 23/00; B63H 23/06; B63J 23/34; F16H 57/0415; F16H 57/0424; F16H 57/043; F16H 57/0436; F16H 57/0452; F16H 57/0476; F16H 57/0495
USPC ............................................. 440/6
See application file for complete search history.

(56) References Cited

U.S. PATENT DOCUMENTS

| | | | |
|---|---|---|---|
| 1,822,573 A * | 9/1931 | Anderson ............ | B63H 20/002 440/88 L |
| 9,630,693 B2 * | 4/2017 | De Kruijf ............ | B63H 21/386 |
| 9,656,734 B1 * | 5/2017 | Hamada ............... | B63H 20/002 |
| 10,295,046 B2 * | 5/2019 | Hamada ................ | B63H 20/20 |

FOREIGN PATENT DOCUMENTS

JP 2005-254978 9/2005

* cited by examiner

*Primary Examiner* — Lars A Olson
(74) *Attorney, Agent, or Firm* — Amin, Turocy & Watson, LLP

(57) ABSTRACT

An outboard engine includes a steering mechanism having a pod propulsion device disposed in water outside a hull; a propulsive drive mechanism that is disposed in the hull and gives a propulsive drive force to the pod propulsion device; and a circulation cooling circuit which has an outward flow path that supplies a cooling oil to the steering mechanism and the propulsive drive mechanism, and an inward flow path which recovers the cooling oil from the steering mechanism and the propulsive drive mechanism, in which the inward flow path and the outward flow path of the circulation cooling circuit communicate with each other inside a case body of the pod propulsion device.

9 Claims, 5 Drawing Sheets

OUTBOARD ENGINE

CROSS-REFERENCE TO RELATED APPLICATION

Priority is claimed on Japanese Patent Application No. 2021-045333, filed on Mar. 19, 2021, the contents of which are incorporated herein by reference.

BACKGROUND

Field of the Invention

The present invention relates to an outboard engine.

Background

An outboard engine generally transfers a rotational output of an engine or an electric motor that is a drive source to a drive shaft disposed to face a vertical direction and converts the rotation of the drive shaft into rotation around a horizontal axis with a bevel gear and transfers the rotation to a propeller shaft. When the propeller shaft rotates, a propeller attached to the propeller shaft rotates around the horizontal axis to propel a hull.

Because the drive source generates heat when it operates, an appropriate cooling structure is required. For example, in a structure that uses seawater for cooling, seawater is taken in from a periphery of the propeller, pumped upward through a pipe by a pump, and used for cooling the drive source. The seawater used for cooling is drained into the sea through another pipe. Such a structure that takes in and cools seawater has high cooling efficiency, but requires a pipe for taking in and draining the water. Therefore, when considering the pipe connection, it is not suitable for a pod propulsion device that performs a turning motion below the hull (see, for example, Japanese Unexamined Patent Application, First Publication No. 2005-254978).

SUMMARY

As a plan to solve the above problem, it is conceivable to cool the drive source via a cooler instead of taking in seawater. Specifically, the cooler is disposed in seawater, and a coolant is circulated between the cooler and the drive source. As a result, a cooling oil whose temperature increases by cooling the drive source is cooled by the seawater around the cooler and sent to the drive source. However, in this configuration, it is necessary to dispose the cooler at a position that does not interfere with the turning motion of the pod propulsion device. In addition, since it is also necessary to dispose the cooler in seawater separately from the pod propulsion device, the underwater resistance during navigation increases, and it is necessary to take measures against rust caused by salt water.

On the other hand, when the cooler is disposed above sea level, the problem of underwater resistance is solved, but pipes and pumps for taking in and draining seawater are required. The pipes and pumps also need to be installed at positions that do not interfere with the pod propulsion device. Moreover, after navigation, it is also necessary to wash each flow path in the pipe and pump with fresh water.

As explained above, when seawater is used to cool the pod propulsion device, many problems occur.

An aspect of the present invention is to provide an outboard engine capable of solving problems of device interference and maintenance associated with the intake and drainage of seawater, while using a pod propulsion device.

A first aspect of the present invention is an outboard engine that is provided on a hull and propels the hull. The outboard engine includes a steering mechanism having a pod propulsion device disposed in water outside the hull; a propulsive drive mechanism that is disposed in the hull and gives a propulsive drive force to the pod propulsion device; and a circulation cooling circuit which has an outward flow path that supplies a cooling oil to the steering mechanism and the propulsive drive mechanism, and an inward flow path which recovers the cooling oil from the steering mechanism and the propulsive drive mechanism. The inward flow path and the outward flow path of the circulation cooling circuit communicate with each other inside a housing of the pod propulsion device.

According to this configuration, the steering mechanism and the propulsive drive mechanism are cooled by the cooling oil supplied through the outward flow path. Further, the cooling oil whose temperature has increased after cooling the steering mechanism and the propulsive drive mechanism is recovered into the housing of the pod propulsion device through the inward flow path. Since the pod propulsion device is disposed in water, the heat of the cooling oil is exhausted into the water through the housing. The water-cooled cooling oil is again supplied to the steering mechanism and the propulsive drive mechanism through the outward flow path to cool them.

In this way, since the housing itself of the pod propulsion device is configured to be used as a cooler to cool the cooling oil with water, it is not necessary to separately provide a cooler. Therefore, various problems such as a problem of interference of the pod propulsion device with the cooler, an increase in underwater resistance due to the installation of the cooler, and a need for maintenance due to the intake of seawater, are solved.

A second aspect is the outboard engine according to the first aspect which may adopt the following configuration. The steering mechanism has a turning shaft having a cylindrical shape which pivotally supports the pod propulsion device around a vertical axis in a freely turnable manner, the propulsive drive mechanism has a driving shaft which is coaxially disposed in the turning shaft and transfers the propulsive drive force, the inward flow path has a driving shaft inside flow path which passes through an inside of the driving shaft and communicates with an inside of the housing, and the outward flow path has a driving shaft outside flow path which is formed between an outer peripheral surface of the driving shaft and an inner peripheral surface of the turning shaft and communicates with the inside of the housing, and a screw blade coaxially provided on the outer peripheral surface of the driving shaft.

According to this configuration, the propulsive drive force is transferred to the pod propulsion device by rotating the driving shaft. At the same time, the screw blade also rotates with the rotation of the driving shaft. As a result, the cooling oil in the housing is sucked up by the rotating screw blade and rises inside the driving shaft outside flow path.

As described above, since the screw blade rotating inside the driving shaft outside flow path fulfills the function of a screw pump, the cooling oil can be circulated and supplied without separately providing an oil pump. Therefore, the outboard engine can be miniaturized.

A third aspect is the outboard engine according to the second aspect which may adopt the following configuration. The pod propulsion device has a driven shaft which receives the propulsive drive force from the driving shaft, a bevel gear which connects the driving shaft and the driven shaft, and a propeller fixed to the driven shaft, and the housing has an oil chamber which accommodates the bevel gear and communicates with both the driving shaft inside flow path and the driving shaft outside flow path.

According to this configuration, the propulsive drive force of the driving shaft is transferred to the driven shaft via the bevel gear.

At this time, since the cooling oil in the oil chamber around the bevel gear is always cooled by the water around the housing, the bevel gear is continuously lubricated and cooled.

In this way, the bevel gear is continuously cooled with water, without a separately provided cooler.

A fourth aspect is the outboard engine according to the third aspect, wherein the housing may further have a branching flow path through which the oil chamber and the driving shaft outside flow path communicate with each other, and which passes through a position between the oil chamber and an outer surface of the housing.

According to this configuration, in addition to the flow directly from the oil chamber to the driving shaft outside flow path, a flow from the oil chamber to the driving shaft outside flow path via the branching flow path is also generated in the cooling oil. Since the branching flow path passes through a position closer to water than the oil chamber, a higher heat exhaust effect can be obtained.

In this way, since the water cooling can be performed while the cooling oil is caused to flow to a position closer to water, it is possible to further lower the temperature of the cooling oil flowing through the driving shaft outside flow path. Therefore, a higher cooling efficiency can be obtained.

A fifth aspect is the outboard engine according to any one of the second to fourth aspects which may adopt the following configuration. The steering mechanism further has a fixed housing which is disposed inside the hull and pivotally supports the turning shaft in a state in which the turning shaft is caused to penetrate the fixed housing, a seal portion which seals between an inner surface of the fixed housing and an outer peripheral surface of the turning shaft, and a driven gear which is coaxially fixed to the outer peripheral surface of the turning shaft and rotates integrally with the turning shaft by receiving a turning drive force, and the outward flow path further has an opening which communicates with the driving shaft outside flow path and is formed at an upper end of the turning shaft, and an oil sump which is partitioned by an inner surface of the fixed housing, the seal portion, and the outer peripheral surface of the turning shaft, and the opening, the driven gear, and the oil sump are disposed sequentially from top to bottom.

According to this configuration, the cooling oil that overflows from the driving shaft outside flow path through the opening goes to the oil sump below the opening along the outer peripheral surface of the turning shaft. Further, on the way to the oil sump, the driven gear is lubricated and cooled. The cooling oil temporarily stored in the oil sump further advances through the outward flow path to continuously cool and lubricate other parts.

In this way, because the driven gear can be cooled and lubricated with cooling oil without the need for a dedicated pipe or the like, the outboard engine can be further miniaturized.

A sixth aspect is the outboard engine according to the fifth aspect which may adopt the following configuration. The propulsive drive mechanism includes a propulsive drive motor which generates the propulsive drive force, a control device which controls the propulsive drive motor, and a heat exchanger which cools the control device by circulation of a refrigerant, and the outward flow path further has a first flow path which guides the cooling oil in the oil sump to the heat exchanger and performs heat exchange with the refrigerant.

According to this configuration, the cooling oil in the oil sump is supplied to the heat exchanger via the first flow path. On the other hand, in the heat exchanger, the heat exhausted from the control device is recovered by the refrigerant. Further, by performing the heat exchange of the heated refrigerant with the cooling oil in the heat exchanger, the heat of the refrigerant can be exhausted to the cooling oil.

In this way, even a device that cannot directly supply the cooling oil can be cooled via the heat exchanger. Moreover, since the heat exchanger is disposed in the hull and does not require water intake, there are no restrictions on the arrangement and no rust countermeasures are required.

A seventh aspect is the outboard engine according to the sixth aspect, wherein the outward flow path may further have a second flow path which sends the cooling oil that has passed through the heat exchanger to the propulsive drive motor.

According to this configuration, the cooling oil that has passed through the heat exchanger is supplied to the propulsive drive motor via the second flow path. The cooling oil that has lubricated and cooled the propulsive drive motor is recovered to the housing through the inward flow path to lower the temperature.

In this way, since the outward flow path is configured to finally cool the propulsive drive motor having a relatively high temperature, cooling can be performed more appropriately than in a case in which the outward flow path is configured with a route of a reverse order in which the propulsive drive motor is cooled first, and then the refrigerant is cooled in the heat exchanger.

An eighth aspect is the outboard engine according to any one of the second to seventh aspects, wherein the driving shaft inside flow path may be formed inside a cooling oil recovery pipe disposed coaxially inside the driving shaft and in a non-contact manner with an inner peripheral surface of the driving shaft.

According to this configuration, the heated cooling oil is recovered in the housing while flowing in the cooling oil recovery pipe. Here, since the cooling oil recovery pipe is not in contact with the inner peripheral surface of the driving shaft, it is possible to remove the likelihood of the heat of the heated cooling oil warming the cold cooling oil that flows through the driving shaft outside flow path (outward flow path) via the wall surface of the driving shaft.

The hull often tilts during navigation, when the direction of the pod propulsion device in the outboard engine is steered or when acceleration is applied to the hull due to gliding or the like. Even if this tilting occurs, because the heat of the cooling oil flowing in the cooling oil recovery pipe is not transferred to the driving shaft, the temperature of the cooling oil flowing in the outward flow path can be kept low and the high cooling efficiency can be exhibited.

A ninth aspect is the outboard engine according to the eighth aspect which may adopt the following configuration. The inward flow path has a first oil pan which temporarily stores the cooling oil that has passed through the steering mechanism and the propulsive drive mechanism, and in which the deepest height difference is formed at a predetermined position, and an upper end opening of the cooling oil recovery pipe is connected to the predetermined position of the first oil pan.

According to this configuration, the cooling oil that has cooled the steering mechanism and the propulsive drive mechanism is guided to and collected in the deepest predetermined position in the oil pan by gravity. The collected cooling oil flows from the upper end opening into the cooling oil recovery pipe by gravity, and then goes to the housing.

In this way, all the cooling oil that has performed cooling can be recovered in the housing. Therefore, the cooling oil can be reliably circulated to exhibit high cooling efficiency.

A tenth aspect is the outboard engine according to the eighth aspect which may adopt the following configuration. The inward flow path has a second oil pan which temporarily stores the cooling oil that has passed through the steering mechanism and the propulsive drive mechanism, and a pump which sucks the cooling oil in the second oil pan and sends the cooling oil to an upper end opening of the cooling oil recovery pipe.

According to this configuration, the cooling oil that has cooled the steering mechanism and the propulsive drive mechanism is guided to and collected in the upper end opening of the cooling oil recovery pipe by the suction force of the pump. The collected cooling oil flows from the upper end opening into the cooling oil recovery pipe due to gravity, and then goes to the housing.

In this way, the cooling oil that has performed cooling can be entirely recovered in the housing. Therefore, the cooling oil can be reliably circulated to exhibit high cooling efficiency.

According to each of the above aspects of the present invention, it is possible to solve the problems of device interference and maintenance associated with the intake and drainage of seawater, even while using the pod propulsion device.

DESCRIPTION OF EMBODIMENTS

Figure 1:
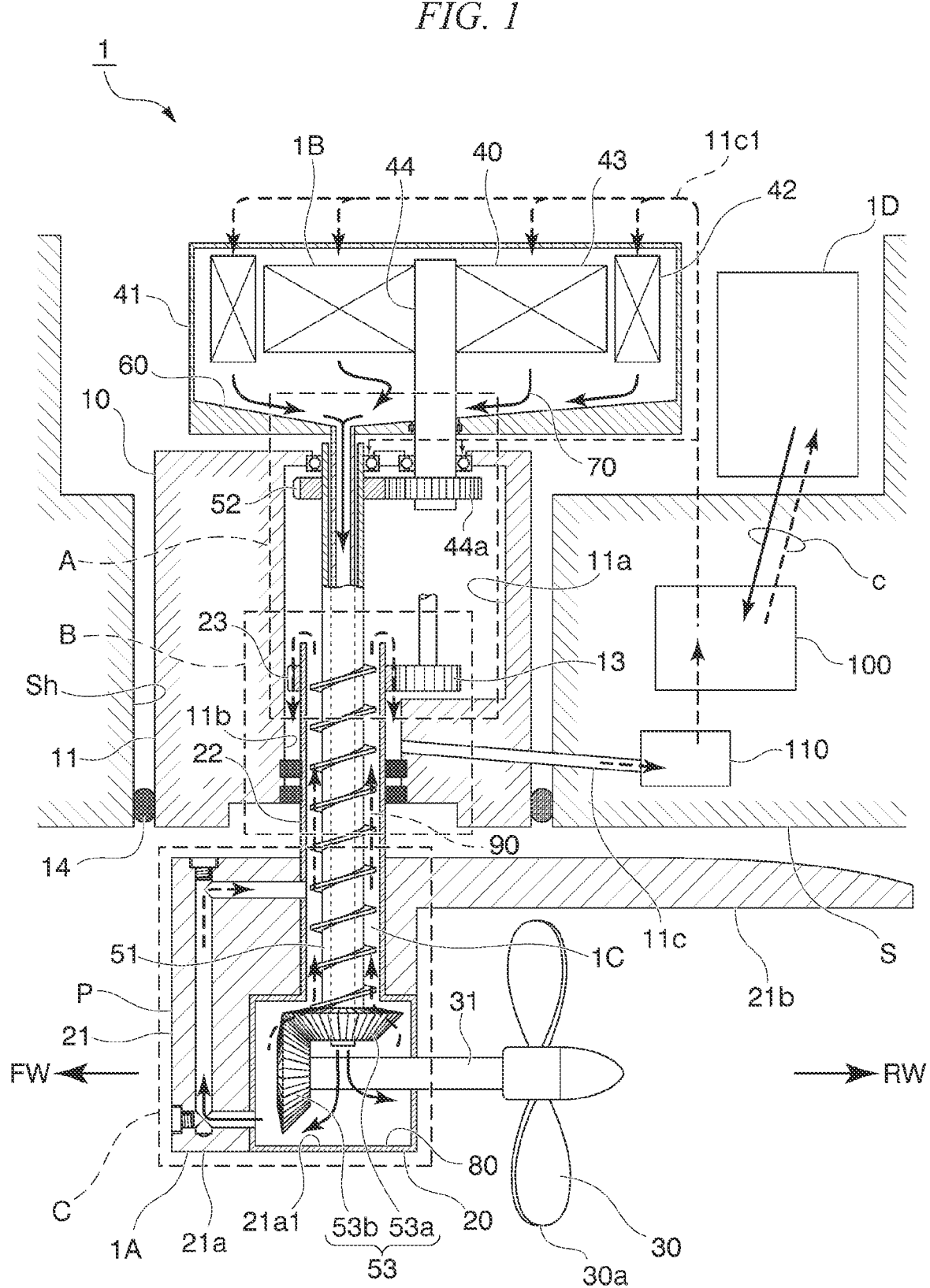
FIG. 1 is a diagram showing an outboard engine according to a first embodiment of the present invention, and is a vertical cross-sectional view showing a state of being disposed on the bottom of a hull.

Embodiments of an outboard engine of the present invention will be described below with reference to the drawings.

Note that a reference numeral FW described in the drawing indicates a forward direction with respect to a traveling direction, and a reference numeral RW indicates a rearward direction with respect to the traveling direction. Hereinafter, "forward direction with respect to the traveling direction" may be simply referred to as "forward," and "rearward direction with respect to the traveling direction" may be simply referred to as "rearward." Further, both the "forward direction with respect to the traveling direction" and the "rearward direction with respect to the traveling direction" may be collectively referred to as a "front-rear direction." Further, left with respect to the front may be referred to as "left," and right with respect to the front may be referred to as "right." Both "left" and "right" may be collectively referred to as a "left-right direction."

First Embodiment

As shown in FIG. 1, an outboard engine 1 of the present embodiment includes a pod propulsion device P provided on the bottom of a hull S to propel the hull S. The outboard engine 1 has a steering mechanism 1A, a propulsive drive mechanism 1B, a circulation cooling circuit 1C, and a control circuit (control device) 1D.

The steering mechanism 1A changes its propulsion direction by the turning motion of the pod propulsion device P, thereby steering the hull S. The steering mechanism 1A has a support portion 10, a turning portion 20, and a propeller 30.

The support portion 10 is fixedly disposed in the hull S, more specifically, in a penetration hole Sh formed on the bottom of the hull S in the vertical direction. The support portion 10 has a fixed housing 11, a turning drive portion (not shown), a turning drive gear 13, and a seal member 14.

The fixed housing 11 is fixedly disposed inside the penetration hole Sh. A lower part of an outer peripheral surface of the fixed housing 11 and a lower part of an inner peripheral surface of the penetration hole Sh are water-tightly sealed by the annular seal member 14. Therefore, the penetration hole Sh is closed by the support portion 10 and the seal member 14.

Figure 2:
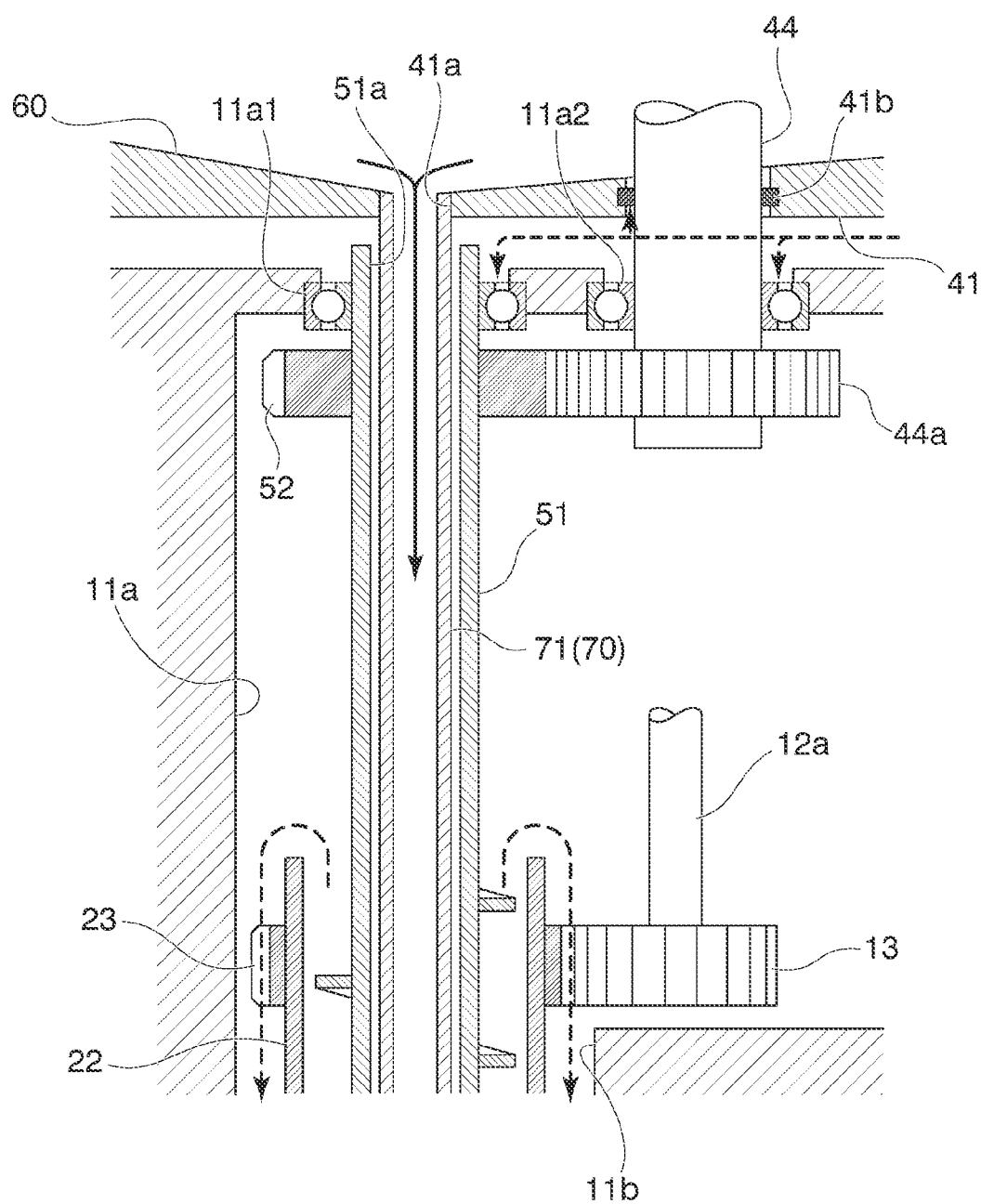
FIG. 2 is a diagram showing the outboard engine and is an enlarged cross-sectional view of a portion A of FIG. 1.

A gear chamber 11a and an oil sump 11b are formed inside the fixed housing 11. The gear chamber 11a is a space formed in the upper part of the fixed housing 11. As shown in FIG. 2, two penetration holes are formed above the gear chamber 11a, and bearings 11a1 and 11a2 are attached to each of the two penetration holes. The bearings 11a1 and 11a2 are disposed adjacent to each other with their central axes facing in the vertical direction. The central axes of the bearings 11a1 and 11a2 are parallel to each other.

As shown in FIG. 1, the oil sump 11b is a space formed continuously below the gear chamber 11a. An oil supply pipe (first flow path) 11c penetrates the fixed housing 11 from a side wall surface of the oil sump 11b toward a side outer part of the fixed housing 11. One end of an oil supply pipe 11c is open to the lower part of the oil sump 11b, and the other end thereof is connected to an oil pump 110 to be described later. The oil supply pipe 11c is disposed to be inclined to gently go down from one end connected to the oil sump 11b toward the other end connected to the oil pump 110.

Figure 3:
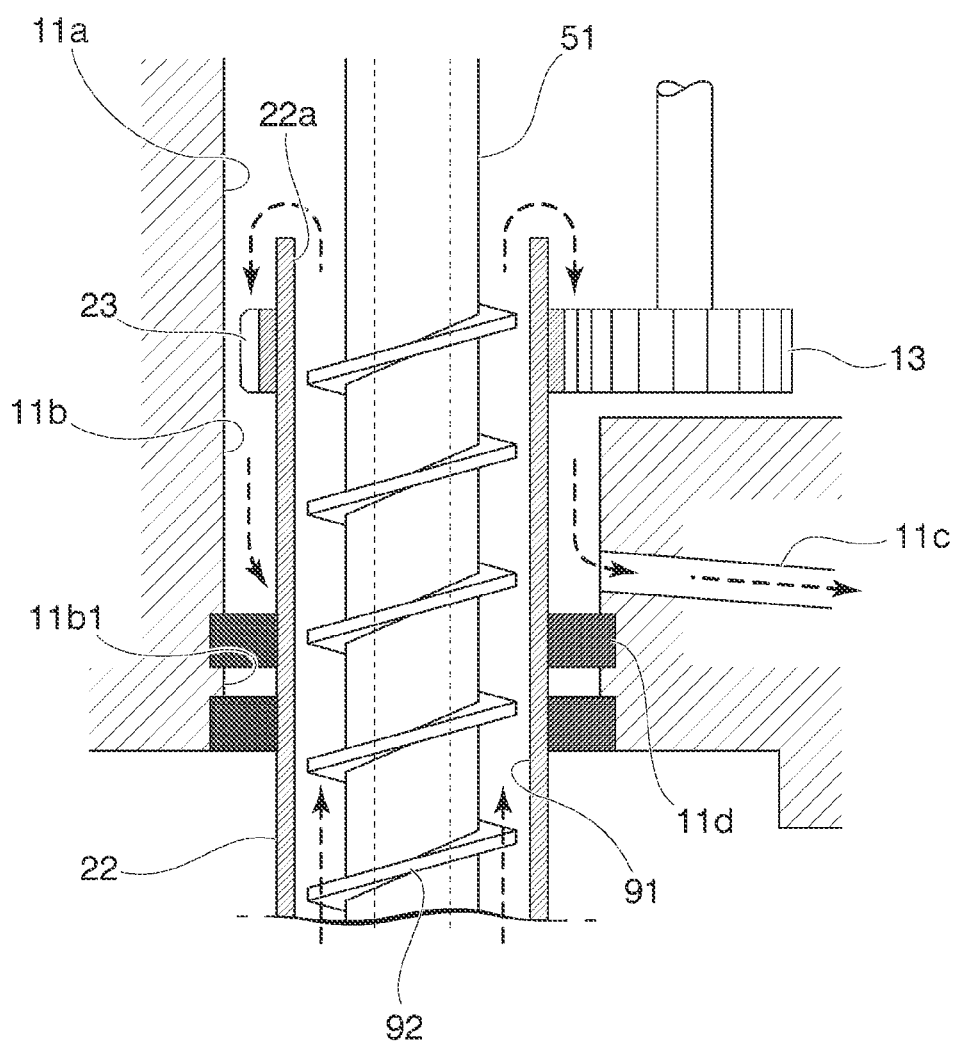
FIG. 3 is a diagram showing the outboard engine and is an enlarged cross-sectional view of a portion B of FIG. 1.

As shown in FIG. 3, a turning shaft 22 to be described later is inserted through the penetration hole 11b1 which is at the lower part of the oil sump 11b of the fixed housing 11 in the vertical direction. Further, a portion between the inner peripheral surface of the penetration hole 11b1 and the outer peripheral surface of the turning shaft 22 is water-tightly sealed by a seal member (seal portion) 11d. Therefore, the penetration hole 11b1 which is at the lower part of the fixed housing 11 is water-tightly closed by the turning shaft 22 and the seal member 11d. The oil sump 11b is an annular space that is partitioned by an inner surface of the fixed housing 11, an upper surface of the seal member 11d, and an outer peripheral surface of the turning shaft 22. The oil sump 11b is formed coaxially with the turning shaft 22 at a position lower than the upper end opening of the turning shaft 22.

The turning drive gear 13 shown in FIG. 2 is a gear that is coaxially fixed to the lower end of the driving shaft 12a of the turning drive unit. The turning drive gear 13 meshes with a driven gear 23 that is coaxially fixed to the upper part of the turning shaft 22. Therefore, when the driving shaft 12a is rotated together with the turning drive gear 13 by the turning drive unit, the turning drive gear 13 rotates the driven gear 23 around the vertical axis.

As a result, the turning shaft 22 also rotates around the vertical axis along with the driven gear 23, and the direction of the pod propulsion device P shown in FIG. 1 may be turned in a desired direction. The pod propulsion device P includes a turning case 21, a turning shaft 22, a propeller shaft (driven shaft) 31, and a propeller 30.

As shown in FIG. 1, the turning portion 20 has a turning case 21 and a turning shaft 22. The turning portion 20 is supported directly below the fixed housing 11 via the turning shaft 22. The turning portion 20 is pivotally supported around a central axis of the turning shaft 22 in a turnable manner.

The turning case 21 has a case body (housing) 21a and a fin 21b. Part of the circulation cooling circuit 1C is provided inside the case body 21a, and the details thereof will be described later. The fin 21b is fixed to the position of the upper end and the rear side of the case body 21a. The fin 21b is disposed above the propeller 30. The fin 21b extends in the horizontal direction from the case body 21a toward the rear.

As shown in FIG. 1, the turning shaft 22 is a long cylindrical body having a central axis along the vertical direction. An upper half of the turning shaft 22 is inserted into the fixed housing 11 and is pivotally supported around the vertical axis by the fixed housing 11 in a freely rotatable manner. On the other hand, a lower half of the turning shaft 22 is fixed to the upper part of the case body 21a in a state of penetrating the upper part of the case body 21a. A cylindrical space having a circular cross-sectional shape perpendicular to the central axis is formed inside the turning shaft 22, and a driving shaft 51, which will be described later, is coaxially inserted in this space.

As shown in FIG. 3, the driven gear 23 described above is coaxially fixed to the upper part of the turning shaft 22. The driven gear 23 is fixed at a height position below the opening 22a of the turning shaft 22. That is, the driven gear 23 is fixed at a directly lower position which goes down from the uppermost position, which is the height position of the opening 22a of the turning shaft 22, by a predetermined dimension. The driven gear 23 is fixed above the seal member 11d. That is, the driven gear 23 is fixed at a directly upper position which is above the oil sump 11b, on which the seal member 11d forms the bottom surface, by a predetermined length. Therefore, from top to bottom, the opening 22a, the driven gear 23, and the oil sump 11b are disposed side by side in this order.

Figure 4:
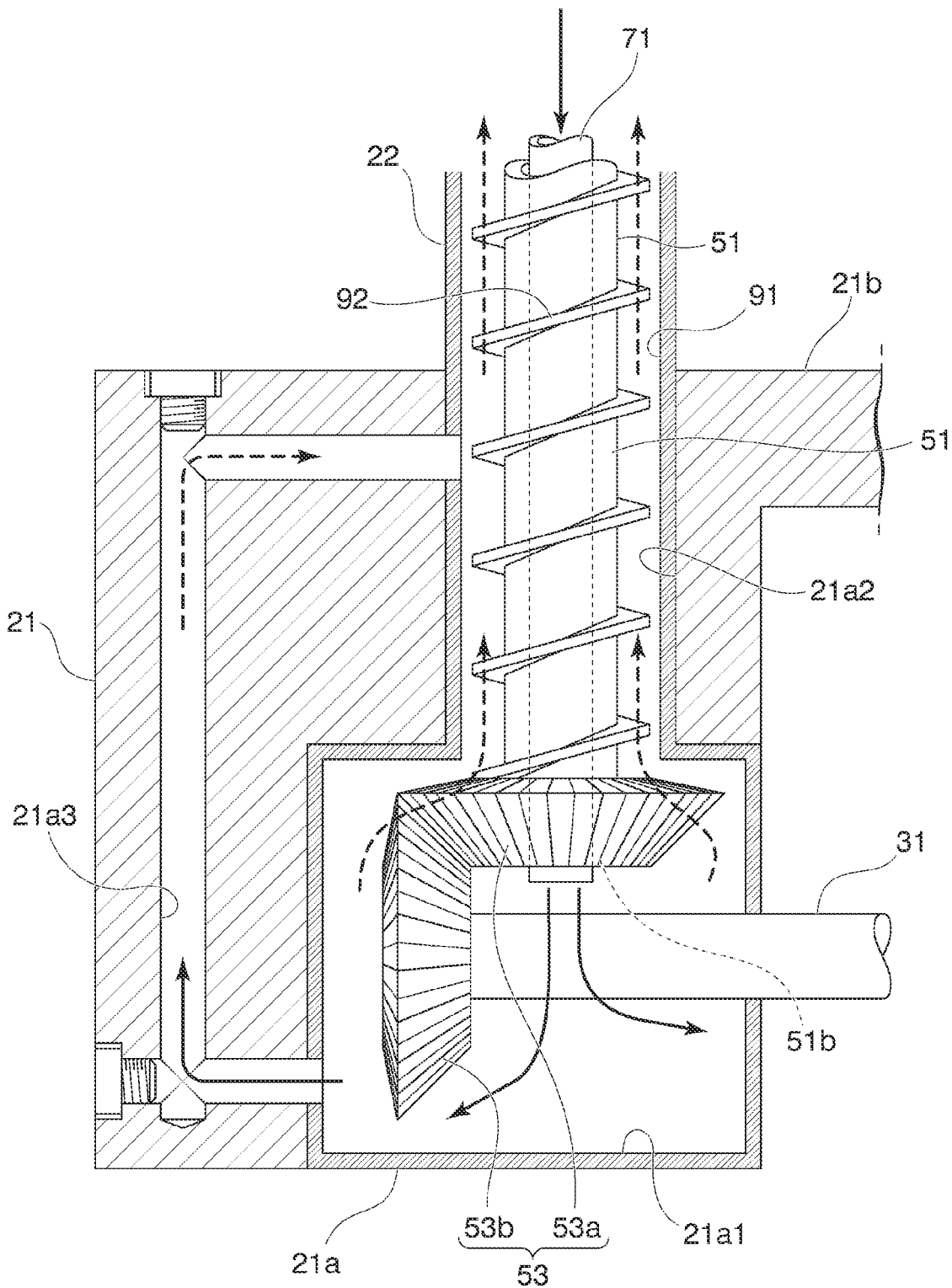
FIG. 4 is a diagram showing the outboard engine and is an enlarged cross-sectional view of a portion C of FIG. 1.

As shown in FIG. 4, the case body 21a is a housing in which an oil chamber 21a1, a turning shaft penetration hole 21a2, and a branching flow path 21a3 are formed. The turning shaft penetration hole 21a2 is a penetration hole extending in the vertical direction and is opened at the upper part of the case body 21a. Further, through this opening, the lower part of the turning shaft 22 is fixed inside the turning shaft penetration hole 21a2 in a state of being coaxially inserted.

Therefore, the direction of the turning case 21 may be turned by rotating the turning shaft 22 around the vertical axis.

As shown in FIG. 4, the oil chamber 21a1 is a space which leads to a lower end of a driving shaft outside flow path 91 (to be described later), which is an internal space of the turning shaft 22. Further, the oil chamber 21a1 is wider than the driving shaft outside flow path 91 and accommodates a bevel gear 53 to be described later. A bearing (not shown) for pivotally supporting the propeller shaft 31 fixed to the driven gear 53b of the bevel gear 53 is provided in the opening that penetrates the side wall of the oil chamber 21a1. Since the bearing provided in this opening has a watertight structure, water around the case body 21a does not enter the oil chamber 21a1.

In the oil chamber 21a1, an opening is also formed at the lower end of the side wall facing the side wall on which the bearing is disposed, and an inlet of the branching flow path 21a3 is connected to this opening. Therefore, the oil chamber 21a1 communicates with the inlet of the driving shaft outside flow path 91 at the upper part thereof and communicates with the inlet of the branching flow path 21a3 at the lower side wall thereof.

The branching flow path 21a3 is formed toward the side part from the lower side wall of the oil chamber 21a1, is formed upward by bending the direction at a right angle before reaching the outer surface of the case body 21a, and next, communicates with the driving shaft outside flow path 91 by bending the direction at a right angle before reaching the upper surface of the case body 21a. The inlet of the branching flow path 21a3 communicates with the lower side wall of the oil chamber 21a1. The outlet of the branching flow path 21a3 communicates with the driving shaft outside flow path 91 via a penetration hole formed on the lower side wall of the turning shaft 22. The outlet of the branching flow path 21a3 is located at a predetermined height directly upward from the lower end position of the driving shaft outside flow path 91.

The branching flow path 21a3 has a substantially U-shape in a vertical cross-sectional view. Therefore, in the branching flow path 21a3, a flow path portion extending in the vertical direction along the outer surface of the case body 21a is located between the oil chamber 21a1 and the side wall surface (outer surface) of the case body 21a. In other words, in the branching flow path 21a3, the flow path portion along the vertical direction in the middle thereof is closer to the side wall surface (outer surface) of the case body 21a than the oil chamber 21a1.

As shown in FIG. 1, the propeller 30 is coaxially fixed to the propeller shaft 31. The propeller 30 has a plurality of blades 30a.

The propeller shaft 31 extends in a direction intersecting (orthogonal to) the driving shaft 51 to be described later and toward the rear from the bevel gear 53 in the vertical cross-sectional view. That is, the propeller shaft 31 is connected to intersect the driving shaft 51 via the bevel gear 53.

A front end of the propeller shaft 31 fixed to the driven gear 53b of the bevel gear 53 is housed in the case body 21a. On the other hand, a portion of the propeller shaft 31 extending rearward from the bearing of the case body 21a is disposed outside the case body 21a. The propeller shaft 31 having a central axis in the horizontal direction is disposed to substantially form an L shape together with the driving shaft 51 (to be described later) having a central axis in the vertical direction.

The propeller 30 is fixed to the rear end of the propeller shaft 31. When the propeller shaft 31 receives a propulsive drive force from the driving shaft 51 via the bevel gear 53, the propeller 30 rotates around the horizontal axis along with the propeller shaft 31.

As shown in FIG. 1, the propulsive drive mechanism 1B includes a propulsive drive motor 40 which is a propulsive drive source, and a propulsive force transmission device 50 which transmits the propulsive drive force of the propulsive drive motor 40 to the propeller shaft 31.

The propulsive drive motor 40 has a motor case 41, a stator 42, a rotor 43, and a motor shaft 44.

The motor case 41 accommodates the stator 42, the rotor 43, and the upper part of the motor shaft 44. The bottom wall of the motor case 41 constitutes an oil pan 60 which is a part of a circulation cooling circuit 1C to be described below. The upper surface of the oil pan 60 is inclined so that the depth is the deepest at the position (predetermined position) at which a driving shaft inside pipe 71, which is also part of the circulation cooling circuit 1C to be described later, is connected. As shown in FIG. 2, the bottom wall of the motor case 41 is provided with a penetration hole 41a and a seal member 41b. The penetration hole 41a is fixed in a state in which the upper end of the driving shaft inside pipe 71 penetrates. Therefore, the penetration hole 41a is sealed by the upper end of the driving shaft inside pipe 71. The seal member 41b water-tightly seals the periphery of the lower end of the motor shaft 44 that vertically penetrates the bottom wall of the motor case 41. Therefore, the cooling oil that has flowed into the oil pan 60 is collected in the upper end opening of the driving shaft inside pipe 71 without causing leakage.

As shown in FIG. 1, the stator 42 has an annular shape, and is disposed inside the motor case 41.

The rotor 43 is coaxially disposed inside the stator 42. The upper part of the motor shaft 44 is coaxially fixed to the center of the rotor 43. The lower part of the motor shaft 44 is pivotally supported by the bearing 11a2 of the fixed housing 11. Therefore, the motor shaft 44 and the rotor 43 are pivotally supported around the vertical axis in a freely rotatable manner. Further, when electric power is supplied to the stator 42 from a power source (not shown), the rotor 43 rotates around the vertical axis together with the motor shaft 44. The propulsive drive force generated by the rotation is transferred to the gear 52 (described later) fixed to the upper end of the driving shaft 51 via the motor gear 44a that rotates integrally with the motor shaft 44, and rotates the driving shaft 51 up and down around the axis.

As shown in FIG. 1, the propulsive force transmission device 50 includes the driving shaft 51, the gear 52, and the bevel gear 53.

As shown in FIG. 2, the driving shaft 51 is a vertically long cylindrical shaft body, and an upper end thereof is pivotally supported by the bearing 11a1. An opening 51a is formed at the upper end of the driving shaft 51. The opening 51a is disposed at a height position that is higher than that of the bearing 11a1. Further, the gear 52 is coaxially fixed at a height position lower than the bearing 11a1. Therefore, the gear 52 is fixed to the outer peripheral surface of the driving shaft 51 at a height position lower than the opening 51a. The driving shaft inside pipe 71 is coaxially inserted into the driving shaft 51 through the opening 51a.

On the other hand, as shown in FIG. 3, a screw blade 92, which will be described later, is coaxially provided on the lower outer peripheral surface of the driving shaft 51. Since the screw blade 92 is formed to be integrated with the driving shaft 51, the screw blade 92 also rotates around the vertical axis by rotationally driving the driving shaft 51 around the vertical axis. A gap is formed between the outer peripheral surface of the driving shaft 51 and the inner peripheral surface of the turning shaft 22, and the screw blade 92 is disposed in the gap. Therefore, when the driving shaft 51 is rotated, the screw blade 92 also rotates, and as a result, the cooling oil in the gap can be pumped upward. Therefore, the driving shaft 51 serves as a screw pump which rotates the screw blade 92 to pump the cooling oil, and serves as a propulsive force transmission mechanism 1B that rotates the propeller shaft 31 and the propeller 30 via the bevel gear 53.

As shown in FIG. 4, the bevel gear 53 has a driving gear 53a and a driven gear 53b.

The driving gear 53a is coaxially fixed to the lower end of the driving shaft 51. More specifically, an opening 51b is formed at the lower end of the driving shaft 51, and the driving gear 53a is fixed to the driving shaft 51 so that the lower surface is located at the same height as the opening 51b. A central axis of the driving gear 53a is directed in the vertical direction and coincides with the central axis of the driving shaft 51.

The driven gear 53b is coaxially fixed to the front end of the propeller shaft 31 as described above. The driven gear 53b is disposed below the driving gear 53a. The central axis of the driven gear 53b is directed in the horizontal direction and coincides with the central axis of the propeller shaft 31.

The driving gear 53a and the driven gear 53b are both bevel gears and are connected to each other in a state of being meshed with each other. Therefore, when the driving gear 53a is rotated together with the driving shaft 51, the meshed driven gear 53b also rotates. At that time, the rotational drive force of the driving gear 53a around the vertical axis is converted into the rotational drive force around the horizontal axis by the driven gear 53b. As a result, because the propeller shaft 31 rotates together with the driven gear 53b, the propeller 30 rotates to give propulsive force to the hull S.

The control circuit 1D shown in FIG. 1 controls the electric power supplied to the propulsive drive motor 40 and the electric power to be supplied to the turning drive unit. The control circuit 1D is cooled by circulating the refrigerant c between the control circuit 1D and the heat exchanger 100.

The circulation cooling circuit 1C lubricates and cools each part of the outboard engine 1 by circulating and supplying the cooling oil. The circulation cooling circuit 1C is configured to include each component provided in the steering mechanism 1A and the propulsive drive mechanism 1B described above, and a flow path and a space formed between the respective components.

As shown in FIG. 1, the circulation cooling circuit 1C includes the oil pan 60, an inward flow path 70, the oil chamber 21a1, an outward flow path 90, a heat exchanger 100, and an oil pump 110.

The oil pan 60 is disposed at a lower part in the motor case 41 as described above. The oil pan 60 recovers the cooling oil in the stator 42 disposed in the upper part thereof and after cooling the rotor 43, and makes the cooling oil flow to an inward flow path 70. Specifically, the oil pan 60 makes the recovered cooling oil flow into the upper end opening of the driving shaft inside pipe 71. Here, the recovery of the cooling oil in the oil pan 60 and the delivery of the cooling oil in the driving shaft inside pipe 71 are performed by gravity (self-weight) which is applied to the cooling oil.

The inward flow path 70 includes the driving shaft inside pipe 71 shown in FIG. 2. The driving shaft inside pipe 71 is a straight pipe extending in the vertical direction, and is disposed coaxially in the driving shaft 51 and in non-contact with the inner peripheral surface of the driving shaft 51. The upper end of the driving shaft inside pipe 71 is connected to the oil pan 60 as shown in FIG. 2, while the lower end thereof penetrates the lower end of the driving shaft 51 and is located below the driving gear 53a. Therefore, the internal space of the oil pan 60 and the oil chamber 21a1 disposed vertically below the oil pan 60 communicate with each other via the flow path (driving shaft inside flow path) in the driving shaft inside pipe 71. Therefore, the cooling oil flowing into the driving shaft inside pipe 71 from the oil pan 60 is sent to the oil chamber 21a1 without coming into contact with the inner wall surface of the driving shaft 51. At this time, the cooling oil is in a state of cooling the propulsive drive motor 40 or the like and increasing the temperature, but flows into the oil chamber 21a1 while increasing the temperature, without transferring the heat to the driving shaft 51. Therefore, the wall surface of the driving shaft 51 is not heated by the cooling oil.

As shown in FIG. 4, the oil chamber 21a1 temporarily stores the cooling oil that has flowed in from the driving shaft inside pipe 71, and exhausts the heat of the cooling oil into the surrounding water through the wall portion of the case body 21a. Therefore, the case body 21a also serves as a gear box which accommodates the bevel gear 53 and as a water-cooled heat exchanger which cools the cooling oil. In this way, since the structure in which the case body 21a of the pod propulsion device is used as a cooler to cool the cooling oil with water is provided, it is not necessary to separately provide a cooler.

The cooling oil cooled in the oil chamber 21a1 is divided into two flows of a flow toward the driving shaft outside flow path 91 and a flow toward the branching flow path 21a3. The flow path through which these two flows pass serves as the outward flow path 90 through which the cooled cooling oil flows. When the cooled cooling oil flows upward through the driving shaft outside flow path 91, at the same time, the heated cooling oil flows downward through the driving shaft inside pipe 71. Although these two flows occur simultaneously inside the turning shaft 22, since the driving shaft inside pipe 71 is not in contact with the driving shaft 51, unnecessary heat exchange does not occur between them. Therefore, the cooling oil cooled in the oil chamber 21a1 and the branching flow path 21a3 may maintain the cooled state.

The flow of cooling oil in the outward flow path 90 will be described. First, when the driving shaft 51 is rotated to obtain the propulsive force, the screw blade 92 around the driving shaft 51 also rotate. As a result, the screw blade 92 functions as a screw pump, sucks the cooling oil cooled in the oil chamber 21a1, and sends the cooling oil upward along the driving shaft outside flow path 91.

Further, since the suction force generated by the screw blade 92 is also applied to the cooling oil in the branching flow path 21a3, the cooling oil branching from the oil chamber 21a1 to the branching flow path 21a3 is also taken into the driving shaft outside flow path 91 and sent upward. Here, as shown in FIG. 4, the oil chamber 21a1 is disposed to be closer to the rear in the case body 21a. As a result, the distance between the outer surface on the front side of the case body 21a and the oil chamber 21a1 is slightly far. Therefore, in the present embodiment, by providing the branching flow path 21a3, a part of the cooling oil in the oil chamber 21a1 is taken in and guided to the vicinity of the outer surface on the front side of the case body 21a. According to this configuration, because the cooling oil flowing through the branching flow path 21a3 may be further cooled by the water around the case body 21a, the temperature of the cooling oil flowing through the driving shaft outside flow path 91 can be further lowered to improve the cooling efficiency.

Further, the volume of the branching flow path 21a3 is smaller than that of the oil chamber 21a1. For example, when the case body 21a is streamlined in a plan view, since a width dimension of the front end portion thereof cannot be widened, in some cases, it may be difficult to bring the oil chamber 21a1 close to the front end portion. Therefore, by disposing the branching flow path 21a3 that does not require a wide width dimension, the front end portion of the case body 21a can also be effectively used as a heat exchange portion.

As shown in FIG. 3, the outward flow path 90 continues even after exiting the driving shaft outside flow path 91. Specifically, the cooling oil overflowing from the upper end of the driving shaft outside flow path 91, that is, the opening 22a at the upper end of the turning shaft 22, lubricates and cools the driven gear 23 and the turning drive gear 13, and then is temporarily stored in the oil sump 11b.

Further, as shown in FIG. 1, the cooling oil in the oil sump 11b is sucked by the oil pump 110 via the oil supply pipe 11c, passes through the heat exchanger 100, and then is sent to the propulsive drive motor 40. The flow path from the oil chamber 21a1 to the propulsive drive motor 40 serves as the outward flow path 90.

In the heat exchanger 100, the cooling oil cools the refrigerant c. The refrigerant c cooled by the cooling oil is supplied to the control circuit 1D. Further, the refrigerant c whose temperature increases by cooling the control circuit 1D is returned to the heat exchanger 100 again and cooled by the cooling oil. In this way, the control circuit 1D is circulated and cooled by the refrigerant c.

The cooling oil after passing through the heat exchanger 100 is supplied into the motor case 41 through a pipe (second flow path) 11c1. Further, the cooling oil is recovered by the oil pan 60 after cooling the stator 42 and the rotor 43. The cooling oil recovered by the oil pan 60 flows down to the oil chamber 21a1 through the driving shaft inside pipe 71 due to gravity. Further, a part of the cooling oil flowing through the pipe 11c1 branches and is supplied to the bearings 11a1 and 11a2.

The flow path from the propulsive drive motor 40 to the oil chamber 21a1 serves as the inward flow path 70.

The gist of the outboard engine 1 according to the present embodiment described above is summarized below.

(1) The outboard engine 1 according to the present embodiment is an outboard engine 1 provided on a hull S to propel the hull S, which includes a steering mechanism 1A having a pod propulsion device P disposed in water outside the hull S; a propulsive drive mechanism 1B disposed in the hull S to give a propulsive drive force to the pod propulsion device P; and a circulation cooling circuit 1C which has an outward flow path 90 which supplies a cooling oil to the steering mechanism 1A and the propulsive drive mechanism 1B, and an inward flow path 70 which recovers the cooling oil from the steering mechanism 1A and the propulsive drive mechanism 1B, in which the inward flow path 70 and the outward flow path 90 of the circulation cooling circuit 1C communicate with each other inside a case body (housing) 21a of the pod propulsion device P.

According to this configuration, the steering mechanism 1A and the propulsive drive mechanism 1B are cooled by the cooling oil supplied through the outward flow path 90. Further, the cooling oil whose temperature has increased after cooling the steering mechanism 1A and the propulsive drive mechanism 1B is recovered into the case body 21a of the pod propulsion device P through the inward flow path 70. Since the pod propulsion device P is disposed in water, the heat of the cooling oil is exhausted into the water through the case body 21a. The water-cooled cooling oil is again supplied to the steering mechanism 1A and the propulsive drive B through the outward flow path 90 to cool them.

In this way, since the case body 21*a* itself of the pod propulsion device P is configured to be used as a cooler to cool the cooling oil with water, it is not necessary to separately provide a cooler. Therefore, various problems such as a problem of interference of the pod propulsion device P with the cooler, an increase in underwater resistance due to the installation of the cooler, and a need for maintenance due to the intake of seawater, are solved.

Therefore, according to the outboard engine 1 of the present embodiment, it is possible to solve the problems of device interference and maintenance associated with the intake and drainage of seawater, even while using the pod propulsion device P.

(2) The outboard engine 1 described in above (1) may have the following configuration. That is, the steering mechanism 1A has a cylindrical turning shaft 22 that pivotally supports the pod propulsion device P around a vertical axis in a freely turnable manner, the propulsive drive mechanism 1B has a driving shaft 51 which is coaxially disposed in the turning shaft 22 to transfer the propulsive drive force, the inward flow path 70 has a driving shaft inside pipe 71 which passes through the driving shaft 51 and communicates with the case body 21*a*, and the outward flow path 90 has a driving shaft outside flow path 91 which is formed between an outer peripheral surface of the driving shaft 51 and an inner peripheral surface of the turning shaft 22 and communicates with the inside of the case body 21*a*, and a screw blade 92 coaxially provided on the outer peripheral surface of the driving shaft 51.

According to this configuration, the propulsive drive force is transferred to the pod propulsion device P by rotating the driving shaft 51. At the same time, the screw blade 92 also rotates with the rotation of the driving shaft 51. As a result, the cooling oil in the case body 21*a* is sucked up by the rotating screw blade 92 and rises inside the driving shaft outside flow path 91.

As described above, since the screw blade 92 rotating together with the driving shaft 51 in the driving shaft outside flow path 91 fulfills the function of the screw pump, the cooling oil can be circulated and supplied without separately providing an oil pump. Therefore, the outboard engine 1 can be miniaturized.

(3) The outboard engine 1 described in above (2) may have the following configuration. That is, the pod propulsion device P has a propeller shaft 31 that receives the propulsive drive force from the driving shaft 51, a bevel gear 53 that connects the driving shaft 51 and the propeller shaft 31, and a propeller 30 fixed to the propeller shaft 31, and the case body 21*a* has an oil chamber 21*a*1 that accommodates the bevel gear 53 and communicates with both the flow path inside the driving shaft inside pipe 71 and the driving shaft outside flow path 91.

According to this configuration, the propulsive drive force of the driving shaft 51 is transferred to the propeller shaft 31 via the bevel gear 53. At this time, since the cooling oil in the oil chamber 21*a*1 around the bevel gear 53 is always cooled by the water around the case body 21*a*, the bevel gear 53 is continuously lubricated and cooled.

In this way, the bevel gear 53 is continuously cooled with water, without separately providing a cooler.

(4) In the outboard engine 1 described in above (3), the case body 21*a* may further have a branching flow path 21*a*3 through which the oil chamber 21*a*1 and the driving shaft outside flow path 91 communicate with each other, and which passes through a position between the oil chamber 21*a*1 and an outer surface of the case body 21*a*

According to this configuration, in addition to the flow directly from the oil chamber 21*a*1 to the driving shaft outside flow path 91, a flow from the oil chamber 21*a*1 to the driving shaft outside flow path 91 via the branching flow path 21*a*3 is also generated. Since the branching flow path 21*a*3 passes through a position closer to water than the oil chamber 21*a*1, a higher heat exhaust effect can be obtained.

In this way, since the water cooling can be performed, while making the cooling oil flow to a position closer to water, it is possible to further lower the temperature of the cooling oil flowing through the driving shaft outside flow path 91. Therefore, a higher cooling efficiency may be obtained.

(5) The outboard engine 1 according to any one of above (2) to (4) may have the following configuration. That is, the steering mechanism 1A further has a fixed housing 11 which is disposed inside the hull S and pivotally supports while making the turning shaft 22 penetrate, a seal member 11*d* that seals between an inner surface of the fixed housing 11 and an outer peripheral surface of the turning shaft 22, and a driven gear 23 which is coaxially fixed to the outer peripheral surface of the turning shaft 22 and rotates integrally with the turning shaft 22 by receiving a turning drive force, and the outward flow path 90 further has an opening 22*a* which communicates with the driving shaft outside flow path 91 and is formed at an upper end of the turning shaft 22, and an oil sump 11*b* which is partitioned by an inner surface of the fixed housing 11, an upper surface of the seal member 11*d*, and the outer peripheral surface of the turning shaft 22, and the opening 22*a*, the driven gear 23, and the oil sump 11*b* are disposed sequentially from top to bottom.

According to this configuration, the cooling oil that overflows from the driving shaft outside flow path 91 through the opening 22*a* goes to the oil sump 11*b* below the opening 22*a* along the outer peripheral surface of the turning shaft 22. Further, on the way to the oil sump 11*b*, the driven gear 23 is lubricated and cooled. The cooling oil temporarily stored in the oil sump 11*b* further advances through the outward flow path 90 to continuously cool and lubricate other parts.

In this way, because the driven gear 23 may be cooled and lubricated with cooling oil without the need for a dedicated pipe or the like, the outboard engine 1 can be further miniaturized.

(6) In the outboard engine described in above (5), the following configuration may be adopted. That is, the propulsive drive mechanism 1B includes a propulsive drive motor 40 which generates a propulsive drive force, a control circuit 1D which controls the propulsive drive motor 40, and a heat exchanger 100 which cools the control circuit 1D by circulation of the refrigerant. The outward flow path 90 further has a first flow path of the oil supply pipe 11*c* which guides the cooling oil in the oil sump 11*b* to the heat exchanger 100 to perform a heat exchange with the refrigerant.

According to this configuration, the cooling oil in the oil sump 11*b* is supplied to the heat exchanger 100 via the first flow path. On the other hand, in the heat exchanger 100, the heat exhausted from the propulsive drive motor 40 is recovered by the refrigerant. Further, by performing the heat exchange of the heated refrigerant with the cooling oil in the heat exchanger 100, the heat of the refrigerant may be exhausted to the cooling oil.

In this way, even a device that cannot directly supply the water cooling can be performed via the heat exchanger 100.

Moreover, since the heat exchanger 100 is disposed in the hull S and does not require water intake, there are no restrictions on the arrangement and no rust countermeasures are required.

(7) In the outboard engine 1 described in above (6), the outward flow path 90 may further have a second flow path (for example, a pipe 11c1 of the embodiment) which sends the cooling oil after passing through the heat exchanger 100 to the propulsive drive motor 40.

According to this configuration, the cooling oil after passing through the heat exchanger 100 is supplied to the propulsive drive motor 40 via the second flow path. The cooling oil after lubricating and cooling the propulsive drive motor 40 is recovered to the case body 21a through the inward flow path 70 to lower the temperature.

In this way, since the outward flow path 90 is configured to finally cool the propulsive drive motor 40 having a relatively high temperature, cooling can be performed more appropriately than a case in which the outward flow path is configured with a route of a reverse order in which the propulsive drive motor 40 is cooled first, and then the refrigerant is cooled in the heat exchanger 100.

(8) In the outboard engine described in any one of above (2) to (7), the flow path in the driving shaft inside pipe 71 may be formed inside the driving shaft inside pipe (cooling oil recovery pipe) 71 disposed coaxially inside the driving shaft 51 and in a non-contact manner with the inner peripheral surface of the driving shaft 51.

According to this configuration, the cooling oil after the temperature rise is recovered in the case body 21a, while flowing in the driving shaft inside pipe 71. Here, since the driving shaft inside pipe 71 is not in contact with the inner peripheral surface of the driving shaft 51, it is possible to prevent the likelihood that the heat of the heated cooling oil warms the cooling oil after cooling that flows through the driving shaft outside flow path 91 (outward flow path 90) via the wall surface of the driving shaft 51.

The hull S at the time of navigation often tilts, when steering the direction of the pod propulsion device P in the outboard engine 1 or when acceleration is applied to the hull S due to gliding or the like. Even if this tilting occurs, because the heat of the cooling oil flowing in the driving shaft inside pipe 71 is not transferred to the driving shaft 51, the temperature of the cooling oil flowing in the outward flow path 90 can be kept low and the high cooling efficiency can be exhibited.

(9) In the outboard engine 1 described in above (8), the following configuration may be adopted. That is, the inward flow path 70 has an oil pan (first oil pan) 60 which temporarily stores the cooling oil after passing through the steering mechanism 1A and the propulsive drive mechanism 1B, and in which the deepest height difference is formed at a predetermined position, and the upper end opening of the driving shaft inside pipe 71 is connected to the predetermined position of the oil pan 60.

According to this configuration, the cooling oil after cooling the steering mechanism 1A and the propulsive drive mechanism 1B is guided and collected to the deepest predetermined position in the oil pan 60 by gravity. The collected cooling oil flows from the upper end opening into the driving shaft inside pipe 71 by gravity, and then goes to the case body 21a.

In this way, all the cooling oil after cooling can be entirely recovered in the case body 21a. Therefore, the cooling oil can be reliably circulated to exhibit high cooling efficiency.

Second Embodiment

Subsequently, an outboard engine 101 according to the second embodiment of the present invention will be described below referring to FIG. 5. Since this embodiment corresponds to a modified example of the first embodiment, only the differences from the first embodiment will be described below, and since the others are the same as those of the first embodiment, explanation thereof will not be provided.

As shown in FIG. 1, the outboard engine 1 of the first embodiment has a biaxial configuration in which the propulsive drive force of the propulsive drive motor 40 is transferred via a driving shaft 51 separate from the motor shaft 44.

Figure 5:
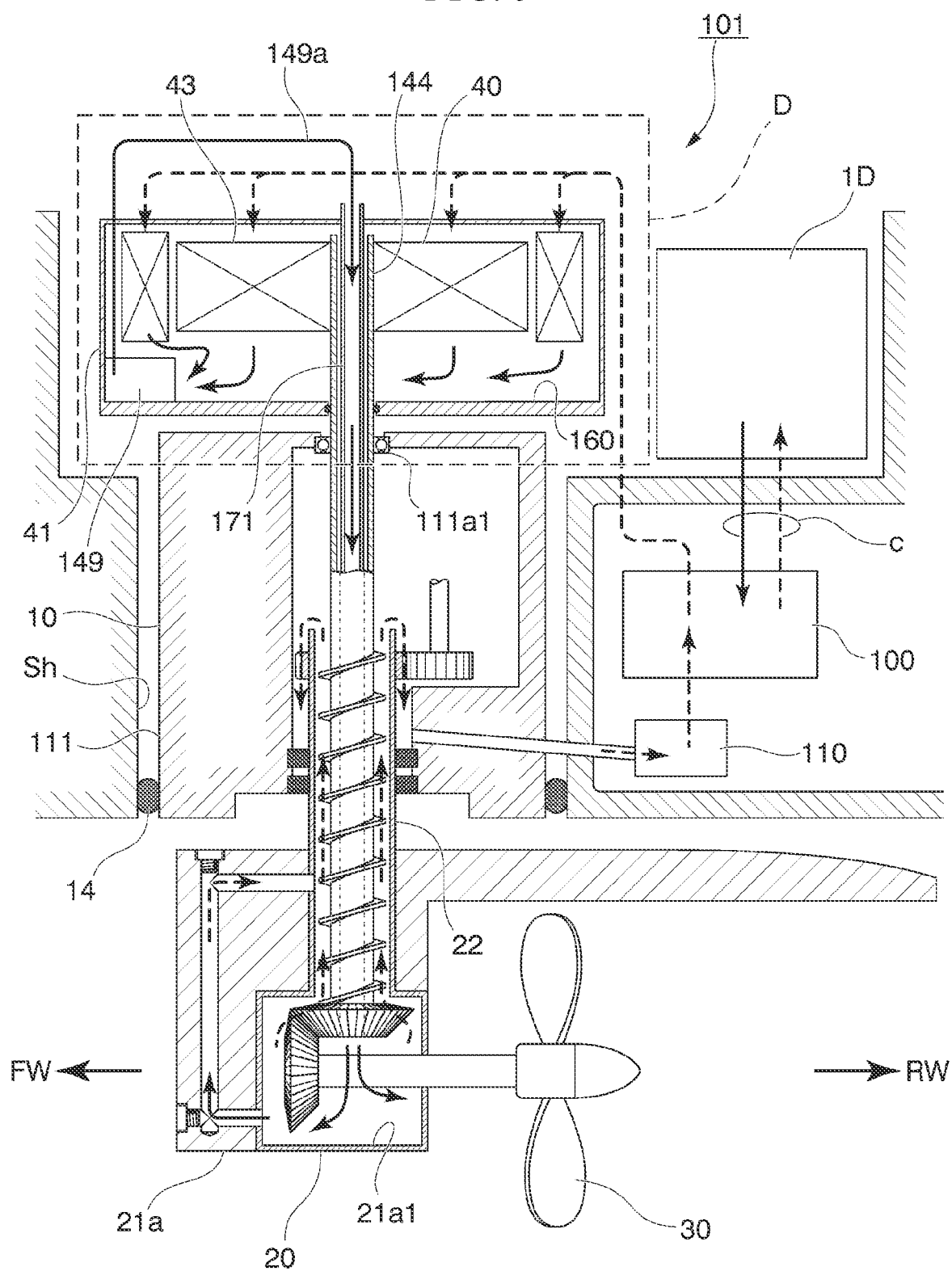
FIG. 5 is a vertical cross-sectional view of an outboard engine according to a second embodiment of the present invention.

However, the configuration is not limited thereto, and as shown in FIG. 5, a uniaxial configuration using only the motor shaft 144 of the propulsive drive motor 40 may be used. That is, the outboard engine 101 of the present embodiment has the same configuration as that of the first embodiment except that the portion of the reference numeral D shown in FIG. 5 is particularly different.

The motor shaft 144 of this embodiment is coaxially fixed to the rotor 43. The motor shaft 144 extends downward from the position of the rotor 43, and a lower end thereof reaches the inside of the oil chamber 21a1. The motor shaft 144 has a tubular shape, and a cylindrical space extending from the upper part of the rotor 43 to the inside of the oil chamber 21a1 is formed inside the motor shaft 144. Further, the driving shaft inside pipe 171 having a length from a position higher than the upper end of the motor shaft 144 to a position lower than the lower end of the motor shaft 144 is coaxially disposed inside the space.

Further, in the present embodiment, the oil pump 149 is disposed inside the motor case 41. The oil pump 149 is fixed to the upper surface of the oil pan 160 and can suck the cooling oil on the oil pan 160. The oil pump 190 and the upper end opening of the driving shaft inside pipe 171 are connected by a recovery pipe 149a. Further, the cooling oil sucked by the oil pump 149 flows into the upper end opening of the driving shaft inside pipe 171 via the recovery pipe 149a. The cooling oil flowing into the upper end opening of the driving shaft inside pipe 171 reaches the oil chamber 21a1 as it is, and is cooled by water around the case body 21a. The cooling oil cooled in this way lubricates and cools each part again through the outward flow path 90.

Also in this embodiment, since the case body 21a, which is a gear box, is configured to function as a heat exchanger, the same operation and effect as in the first embodiment can be obtained. In addition, according to the present embodiment, since the uniaxial configuration is provided instead of the biaxial configuration, there is no need for the motor gear 44a and the gear 52, and the device configuration can be made simpler and compact.

Although the oil pan 160 is a flat planar surface in FIG. 5, the height difference may be provided so that the depth is the deepest at the suction position of the oil pump 149.

In this embodiment, the following (10) is adopted instead of the above (9) among the main points described in the first embodiment.

(10) In the outboard engine 101 of the present embodiment, the inward flow path 70 has an oil pan (second oil pan) 160 which temporarily stores the cooling oil after passing through the steering mechanism 1A and the propulsive drive mechanism 1B and an oil pump (pump) 149 which sucks the cooling oil in the oil pan 160 and sends to an upper end opening of the driving shaft inside pipe 171.

According to this configuration, the cooling oil after cooling the steering mechanism 1A and the propulsive drive mechanism 1B is guided and collected to the upper end opening of the driving shaft inside pipe 171 by the suction force of the oil pan 160.

The collected cooling oil flows from the upper end opening into the driving shaft inside pipe 171 due to gravity, and then goes to the case body 21a.

In this way, all the cooling oil after cooling can be entirely recovered in the case body 21a. Therefore, the cooling oil can be reliably circulated to exhibit high cooling efficiency.

While preferred embodiments of the invention have been described and illustrated above, it should be understood that these are exemplary of the invention and are not to be considered as limiting. Additions, omissions, substitutions, and other modifications may be made without departing from the scope of the present invention. Accordingly, the invention is not to be considered as being limited by the foregoing description and is only limited by the scope of the appended claims.

What is claimed is:

1. An outboard engine which is provided on a hull and propels the hull, the outboard engine comprising:
    a steering mechanism having a pod propulsion device disposed in water outside the hull;
    a propulsive drive mechanism that is disposed in the hull and gives a propulsive drive force to the pod propulsion device; and
    a circulation cooling circuit which has an outward flow path that supplies a cooling oil to the steering mechanism and the propulsive drive mechanism, and an inward flow path which recovers the cooling oil from the steering mechanism and the propulsive drive mechanism,
    wherein the inward flow path and the outward flow path of the circulation cooling circuit communicate with each other inside a housing of the pod propulsion device,
    the steering mechanism has a turning shaft having a cylindrical shape which pivotally supports the pod propulsion device around a vertical axis in a freely turnable manner,
    the propulsive drive mechanism has a driving shaft which is coaxially disposed in the turning shaft and transfers the propulsive drive force,
    the inward flow path has a driving shaft inside flow path which passes through an inside of the driving shaft and communicates with an inside of the housing, and
    the outward flow path has
        a driving shaft outside flow path which is formed between an outer peripheral surface of the driving shaft and an inner peripheral surface of the turning shaft and communicates with the inside of the housing, and
        a screw blade coaxially provided on the outer peripheral surface of the driving shaft.

2. The outboard engine according to claim 1,
    wherein the pod propulsion device has
        a driven shaft which receives the propulsive drive force from the driving shaft,
        a bevel gear which connects the driving shaft and the driven shaft, and
        a propeller fixed to the driven shaft, and
    the housing has an oil chamber which accommodates the bevel gear and communicates with both the driving shaft inside flow path and the driving shaft outside flow path.

3. The outboard engine according to claim 2,
    wherein the housing further has a branching flow path through which the oil chamber and the driving shaft outside flow path communicate with each other, and which passes through a position between the oil chamber and an outer surface of the housing.

4. The outboard engine according to claim 1,
    wherein the steering mechanism further has
        a fixed housing which is disposed inside the hull and pivotally supports the turning shaft in a state in which the turning shaft is caused to penetrate the fixed housing,
        a seal portion which seals between an inner surface of the fixed housing and an outer peripheral surface of the turning shaft, and
        a driven gear which is coaxially fixed to the outer peripheral surface of the turning shaft and rotates integrally with the turning shaft by receiving a turning drive force,
    the outward flow path further has
        an opening which communicates with the driving shaft outside flow path and is formed at an upper end of the turning shaft, and
        an oil sump which is partitioned by an inner surface of the fixed housing, the seal portion, and the outer peripheral surface of the turning shaft, and
        the opening, the driven gear, and the oil sump are disposed sequentially from top to bottom.

5. The outboard engine according to claim 4,
    wherein the propulsive drive mechanism includes
        a propulsive drive motor which generates the propulsive drive force,
        a control device which controls the propulsive drive motor, and
        a heat exchanger which cools the control device by circulation of a refrigerant, and
    the outward flow path further has a first flow path which guides the cooling oil in the oil sump to the heat exchanger and performs heat exchange with the refrigerant.

6. The outboard engine according to claim 5,
    wherein the outward flow path further has a second flow path which sends the cooling oil that has passed through the heat exchanger to the propulsive drive motor.

7. The outboard engine according to claim 1,
    wherein the driving shaft inside flow path is formed inside a cooling oil recovery pipe disposed coaxially inside the driving shaft and in a non-contact manner with an inner peripheral surface of the driving shaft.

8. The outboard engine according to claim 7,
    wherein the inward flow path has a first oil pan which temporarily stores the cooling oil that has passed through the steering mechanism and the propulsive drive mechanism, and in which the deepest height difference is formed at a predetermined position, and
    an upper end opening of the cooling oil recovery pipe is connected to the predetermined position of the first oil pan.

9. The outboard engine according to claim 7,
    wherein the inward flow path has
        a second oil pan which temporarily stores the cooling oil that has passed through the steering mechanism and the propulsive drive mechanism, and
        a pump which sucks the cooling oil in the second oil pan and sends the cooling oil to an upper end opening of the cooling oil recovery pipe.

* * * * *